United States Patent [19]

Beck

[11] Patent Number: 5,769,193
[45] Date of Patent: Jun. 23, 1998

[54] TELESCOPING VIBRATION DAMPER

[75] Inventor: Hubert Beck, Eitorf-Keuenhof, Germany

[73] Assignee: Fichtel & Sachs AG, Eitorf, Germany

[21] Appl. No.: 577,627

[22] Filed: Dec. 22, 1995

[30]   Foreign Application Priority Data

Dec. 22, 1994  [DE]  Germany ........................... 44 45 926.2

[51] Int. Cl.⁶ ....................................................... F16F 9/00
[52] U.S. Cl. ................................ 188/322.22; 188/322.15; 188/319; 92/192
[58] Field of Search .................................... 188/319, 279, 188/282, 316, 322.15, 322.22; 92/181 P, 185, 192; 280/708, 714

[56]             References Cited

U.S. PATENT DOCUMENTS

| | | | |
|---|---|---|---|
| 5,148,897 | 9/1992 | Vanroye | 188/322.22 |
| 5,248,014 | 9/1993 | Ashiba | 188/322.15 |
| 5,277,283 | 1/1994 | Yamaoka | 188/322.15 |
| 5,293,971 | 3/1994 | Kanari | 188/322.15 |

FOREIGN PATENT DOCUMENTS

| | | |
|---|---|---|
| 3701557 | 8/1988 | Germany . |
| 3935159 | 4/1991 | Germany . |

*Primary Examiner*—Robert J. Oberleitner
*Assistant Examiner*—C. T. Bartz
*Attorney, Agent, or Firm*—Nils H. Ljungman and Associates

[57]             ABSTRACT

Telescoping vibration damper consisting of a work cylinder, a piston which is guided on a piston rod and divides the work cylinder into two work chambers, and passages in the piston which empty on at least one end into a ring-shaped chamber, the encircling control edges of which are covered by valve plates, whereby there is at least one additional valve plate located at some axial distance from the first valve plate, which together with a support element forms an additional ring-shaped chamber, whereby the first and additional ring-shaped chambers are connected to one another by means of a flow connection.

11 Claims, 9 Drawing Sheets

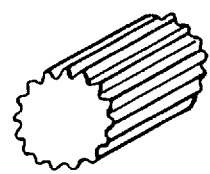
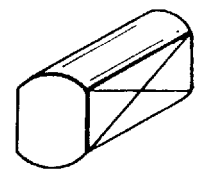
Fig. 8  Fig. 9
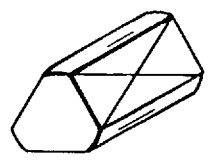
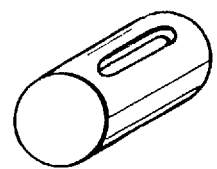
Fig.10  Fig.11
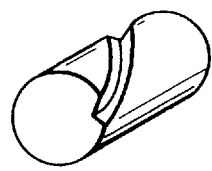
Fig.12

TELESCOPING VIBRATION DAMPER

BACKGROUND OF THE INVENTION

1. Field of the Invention

The present invention relates to a telescoping vibration damper that includes a work cylinder, a piston which is guided on a piston rod and divides the work cylinder into two working chambers, and passage channels in the piston which empty on at least one end into a ring-shaped chamber, the encircling control edge of which is covered by valve plates (or discs).

2. Background Information

Various pistons for hydraulic telescoping vibration dampers have been proposed (e.g., German Patent No. 39 35 159, German Laid Open Patent Application No. 37 01 557), in which each group of flow channels is provided with an inlet and outlet opening, whereby one of the openings is provided with valve plates so that the flow can only run in one direction in each channel. The inlet and output channels are thereby located on the end surfaces of the piston body, whereby an encircling control edge is covered by valve plates. Thus, disc-shaped valve elements which have a relatively large diameter can be used, which have advantages not only in terms of their spring characteristic and their bending length, but which also permit degressive damping forces (e.g., damping forces which diminish, or become softer, with respect to increased force).

OBJECT OF THE INVENTION

One object of the present invention is the provision of a piston for a hydraulic vibration damper wherein, by means of a corresponding design and configuration, a large pressurized surface of the valve plates is created, so that not only can a proper opening action of the valve plates be achieved, but also degressive damping force characteristics.

SUMMARY OF THE INVENTION

The invention teaches that the above-noted objects of the invention can be accomplished if there is at least one additional valve plate which is located at an axial distance from the first valve plate, which additional valve plate, together with a support element, forms an additional ring-shaped chamber, and wherein the first and the second ring-shaped chambers are connected to one another by means of a flow connection.

In this embodiment, it is advantageous that on account of the use of the additional valve plate, the surface which is pressurized by the damping medium, e.g., in the decompression direction, is almost doubled. On account of the location and orientation of the spring plates, the total spring constant is modified by the same extent, so that the characteristic of the damping force assumes a corresponding degressive curve.

In an additional embodiment of the invention, the first and the additional valve plates are supported in relation to one another by means of a spacer sleeve located radially inward.

In an additional embodiment, the support element is in the form of an element which extends from radially inward to radially outward and which, radially inward, has an extension which radially outwardly at approximately right angles in the direction of the longitudinal axis toward the valve plate. The extension thereby advantageously has a diameter which is approximately equal to that of the control edge.

In an additional embodiment, the diameter (D) of the control edge is greater than the diameter (d) of the control edge of the extension. Consequently, different opening points of the first valve plate can be achieved in relation to the additional valve plate, so that the damping force characteristic can thereby be adapted to meet the corresponding requirements.

In an additional configuration, the flow connection is located in the vicinity of a projection which is used to locate the valve plates.

In an additional embodiment, simple measures make it possible to locate the flow connection in the vicinity of the inside diameter of the spacer sleeve. All sorts of different types of flow connections can thereby be created, without having to make modifications to the projection of the piston. These flow connections can vary in terms of length and diameter, so that the quantitative flow and the flow time of the damping medium can be influenced.

In an additional configuration, the support element has a recess which forms a constant passage between the two work chambers. Such a constant passage influences the damping characteristic in the range of low piston velocities, so that the opening of the valve plates can be shifted into a corresponding intermediate or higher piston velocity range, as a function of the realization of the constant passage.

In one favorable embodiment, at least one valve plate is centered with its center hole on the projection used to locate it.

The first valve plate is also centered on a projection on the control edge, and has clearance in the center area. Alternatively, the additional valve plate can be centered on the support element, and can also have clearance in the center area.

In one design, a structurally simple flow connection from the first ring-shaped chamber to the second ring-shaped chamber can be achieved if the first and the second valve plates, as well as the spacer sleeve, have clearance in the center area. The damping means can then advantageously pressurize both valve plates equally, between the projection of the piston of the vibration damper and as it flows past the inside diameter of the spacer sleeve.

In an additional embodiment, the first and/or additional valve plates can consist of at least two individual plates. In this case, the plates which also face one another can be tapered in steps, so that the spacer sleeve can be replaced with such a structure, if necessary.

BRIEF DESCRIPTION OF THE DRAWINGS

Preferred embodiments of the invention are schematically illustrated in the accompanying drawings, wherein:

FIGS. 8 to 12 show various embodiments for the formation of the flow connection;

DESCRIPTION OF THE PREFERRED EMBODIMENT

Figure 1:
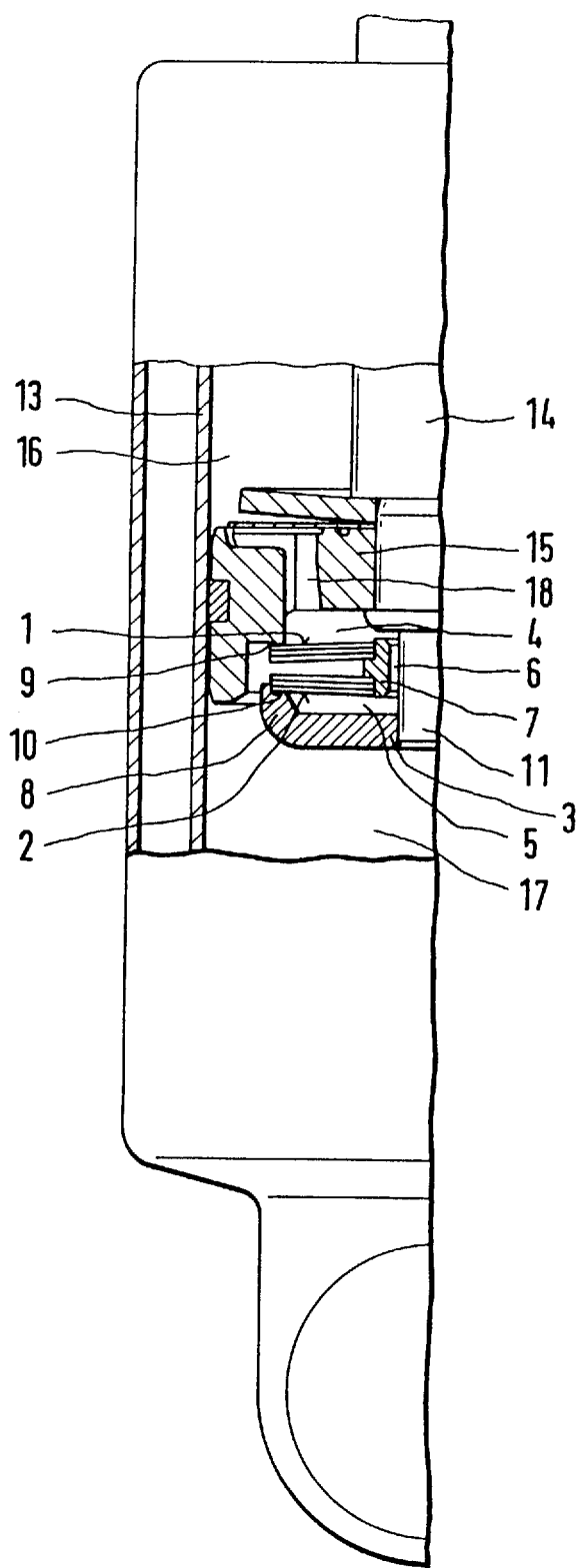
FIG. 1 is an elevational view in partial cross section of the inventive vibration damper showing the piston and valve plates in cross section.

The vibration damper illustrated in FIG. 1 consists essentially of the work cylinder 13, the piston rod 14 and the work piston 15. In this partial section, only the passage channels and valve plates for the decompression stage are shown. The valve device for the compression stage could be any of a number of vibration damper valves well known in the art and is therefore not shown on this embodiment.

In the decompression stage, the damping medium flows from the work chamber 16 via the passage channels 18 into the ring-shaped chamber 4, and simultaneously via the flow connection 6 into the additional ring-shaped chamber 5. Thus the valve plates 1 and 2 are pressurized simultaneously. As soon as the valve plates 1 and 2 have lifted up off the control edges 9 and 10 respectively, the damping medium flows into the lower work chamber 17. The two valve plates 1 and 2 are held at some axial distance from one another by means of the spacer sleeve 7, whereby the valve plate 2 is simultaneously held by means of the support element 3, and the ring-shaped chamber 5 is formed by the valve plate 2, the support element 3 and the axial extension 8. The support element 3 is thereby fixed in position on the projection 11 of the piston 15 or the piston rod 14.

Figure 2:
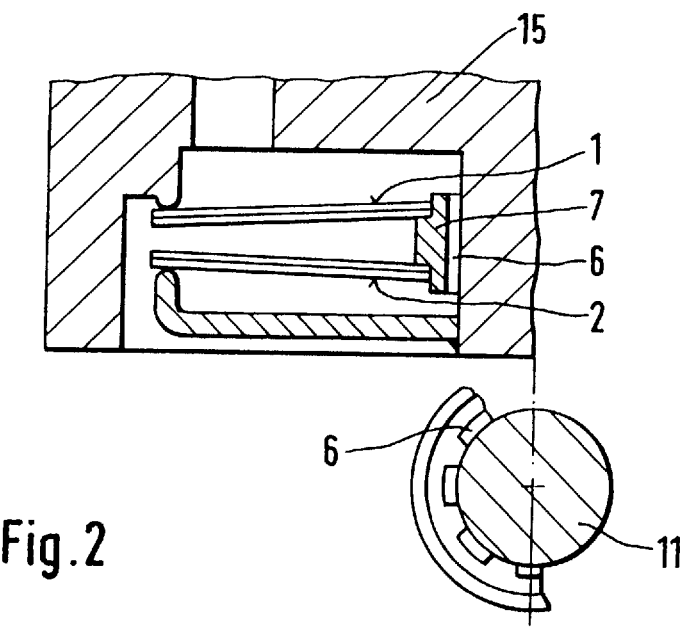
FIGS. 2 and 3 are more detailed cross sectional views showing additional embodiments of the valve plates with the flow connection as a detail, in cross section.

FIG. 2 shows an embodiment in which the piston 15 is provided with valve plates 1 and 2, and wherein the spacer sleeve 7 forms the flow connection 6 on its inside diameter, the flow connection 6 being realized in the form of grooves which are distributed around the radially interior periphery of the spacer sleeve 7.

Figure 3:
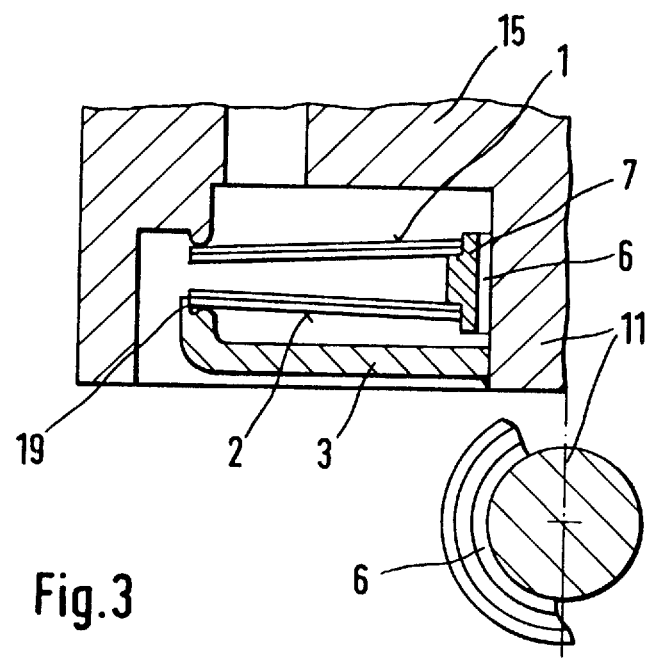

In contrast to the embodiment illustrated in FIG. 2, FIG. 3 represents a flow connection 6 in which the spacer sleeve 7 is located with some clearance or at a distance from the projection 11 of the piston 15, and the spacer sleeve 7 is centered by means of the shoulder 19 on the support element 3. The shoulder 19 thus centers the valve plate 2 and simultaneously, by means of the spacer sleeve 7, it centers the valve plate 1.

Figure 4:
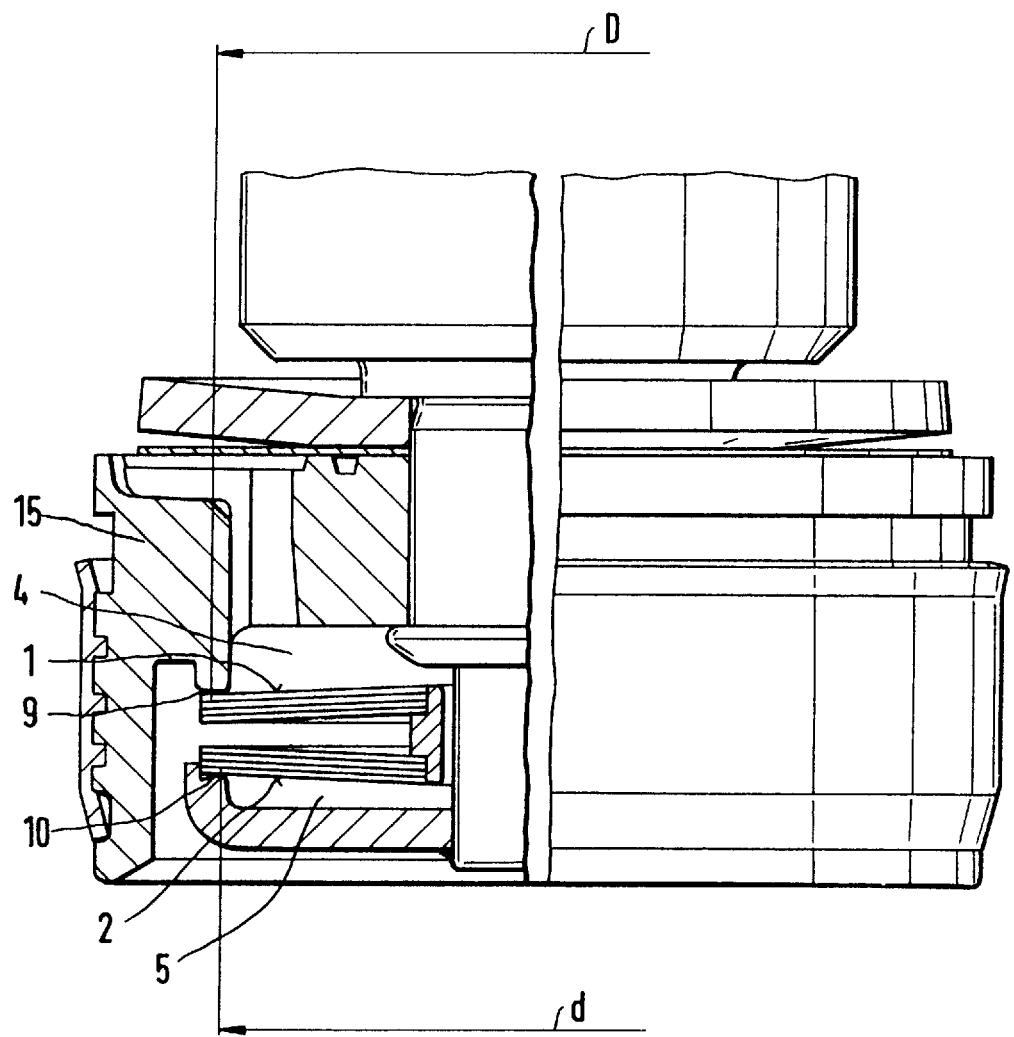
FIGS. 4 and 5 are partial cross sectional views showing other embodiments of the piston in cross section.

FIG. 4 shows an assembly drawing of a piston in which the valve plate 1 and the valve plate 2 each have a control edge 9 and a control edge 10, respectively, whereby the control edges have different diameters. The diameter D of the control edge 9 is larger than the diameter d of the control edge 10, so that when there is constant pressure in the ring-shaped chamber 4 or the ring-shaped chamber 5, there is a different opening action of the valve plates 1 and 2 respectively. It thereby becomes possible to achieve a corresponding modification of the damping force characteristic by varying the control edge diameters D and d.

Figure 5:
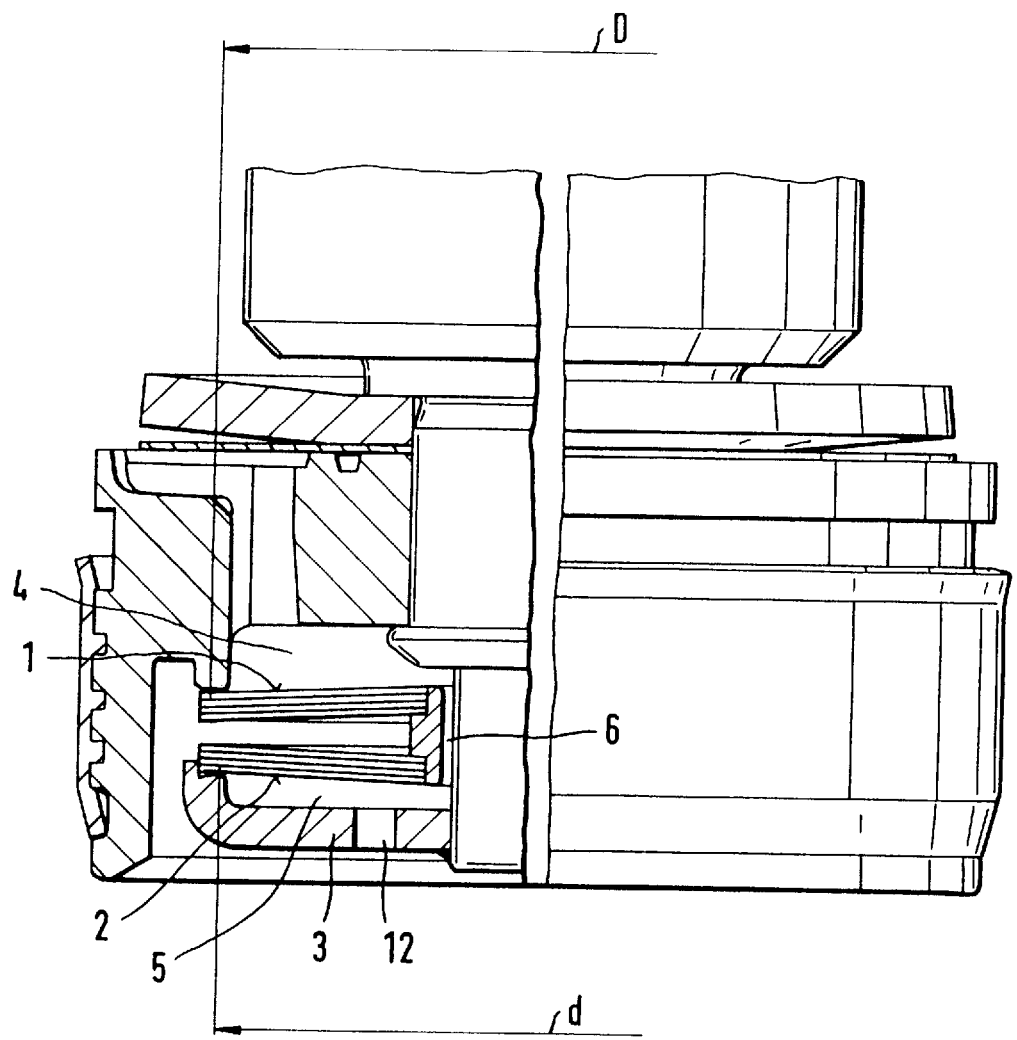

FIG. 5 is a schematic illustration of an embodiment which is similar to the one illustrated in FIG. 4, but with the distinction that the support element 3 is provided with a recess (or a throughgoing hole or aperture) 12. This recess (or hole or aperture) 12 acts as a constant passage for the damping medium from the upper work chamber 16 into the lower work chamber 17 or vice-versa, and under normal conditions, makes it possible to use the range of low piston velocities without the opening of the valve with the valve plates 1 and 2 in this range of piston velocity.

Figures 6, 7:
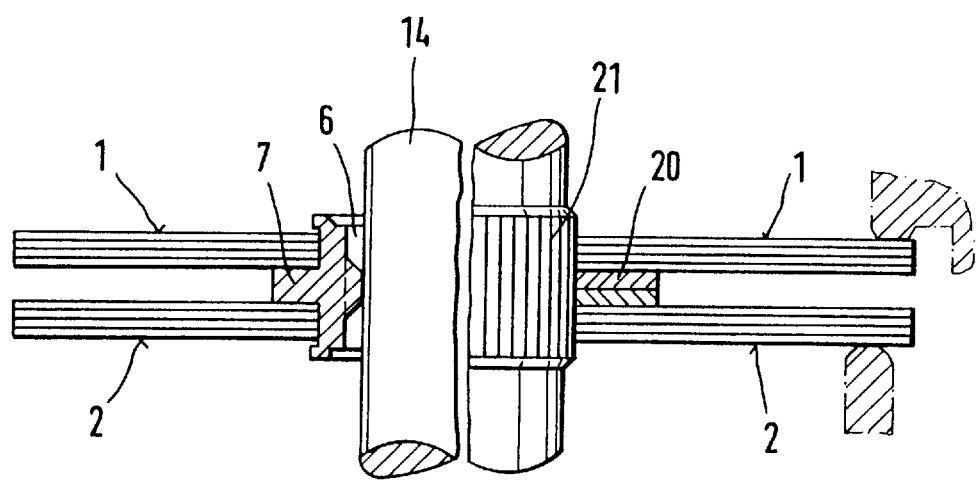
FIGS. 6 and 7 show additional alternative embodiments of the spring plates, together with the spacer sleeve, in cross section.

Additional embodiments of the valve plates 1 and 2 are illustrated in FIGS. 6 and 7. In FIG. 6, the left half of the figure shows the valve plates 1 and 2 separated from one another by means of a spacer sleeve 7, while in FIG. 7, the right half of the figure shows, in place of a spacer sleeve 7, additional discs 20 which are used to create the axial distance between the valve plates 1 and 2. The flow connection 6 in the embodiment of FIG. 6 is created between the spacer sleeve 7 and the piston rod 14, while the flow connection in FIG. 7 is created by a straight knurling 21 formed on the piston rod 14.

FIGS. 8 to 12 illustrate additional embodiments which show various means by which the flow connection 6 can be created. FIG. 8, for example, shows straight knurling; FIG. 9 key surfaces; FIG. 10 several key surfaces distributed over the periphery; and FIGS. 11 and 12 each show machined grooves which run axially and helically respectively.

Figure 13:
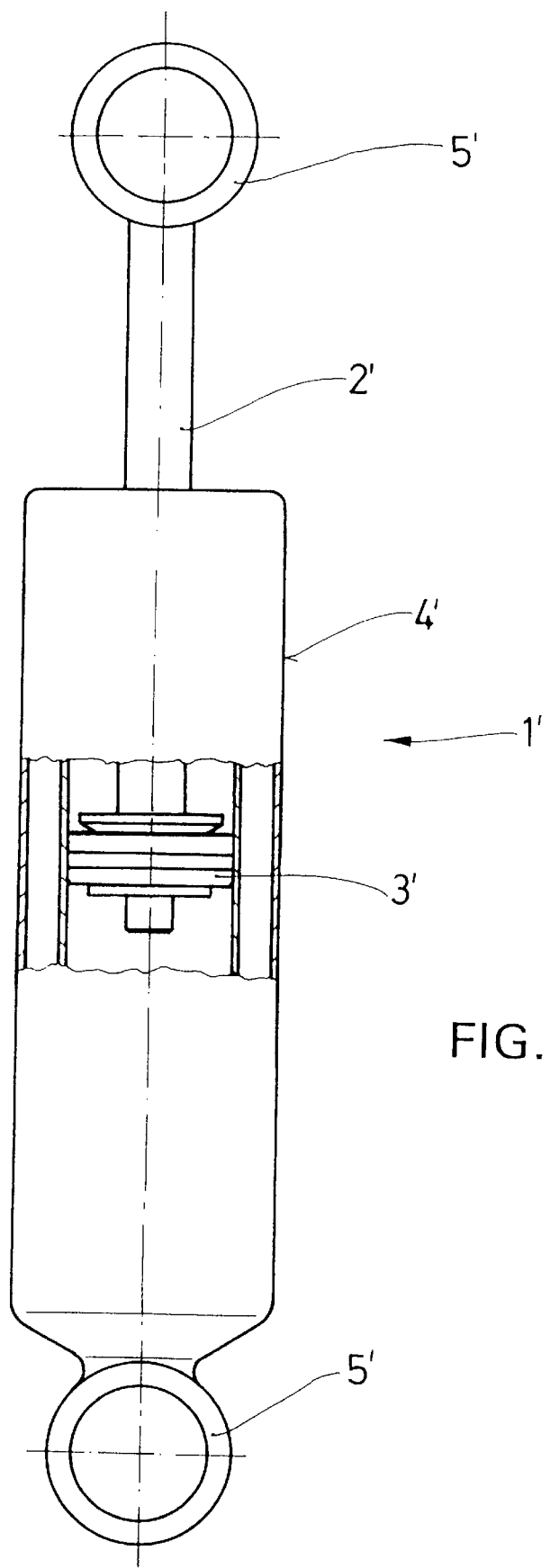
FIG. 13 is a broken away elevational view of a shock absorber.

FIG. 13 illustrates a shock absorber which preferably includes an external tube 4', a piston 3' fastened to a piston rod 2', and the fastening devices 5' which are preferably fastened to the piston rod 2' and to the external tube 4'.

Figure 14:
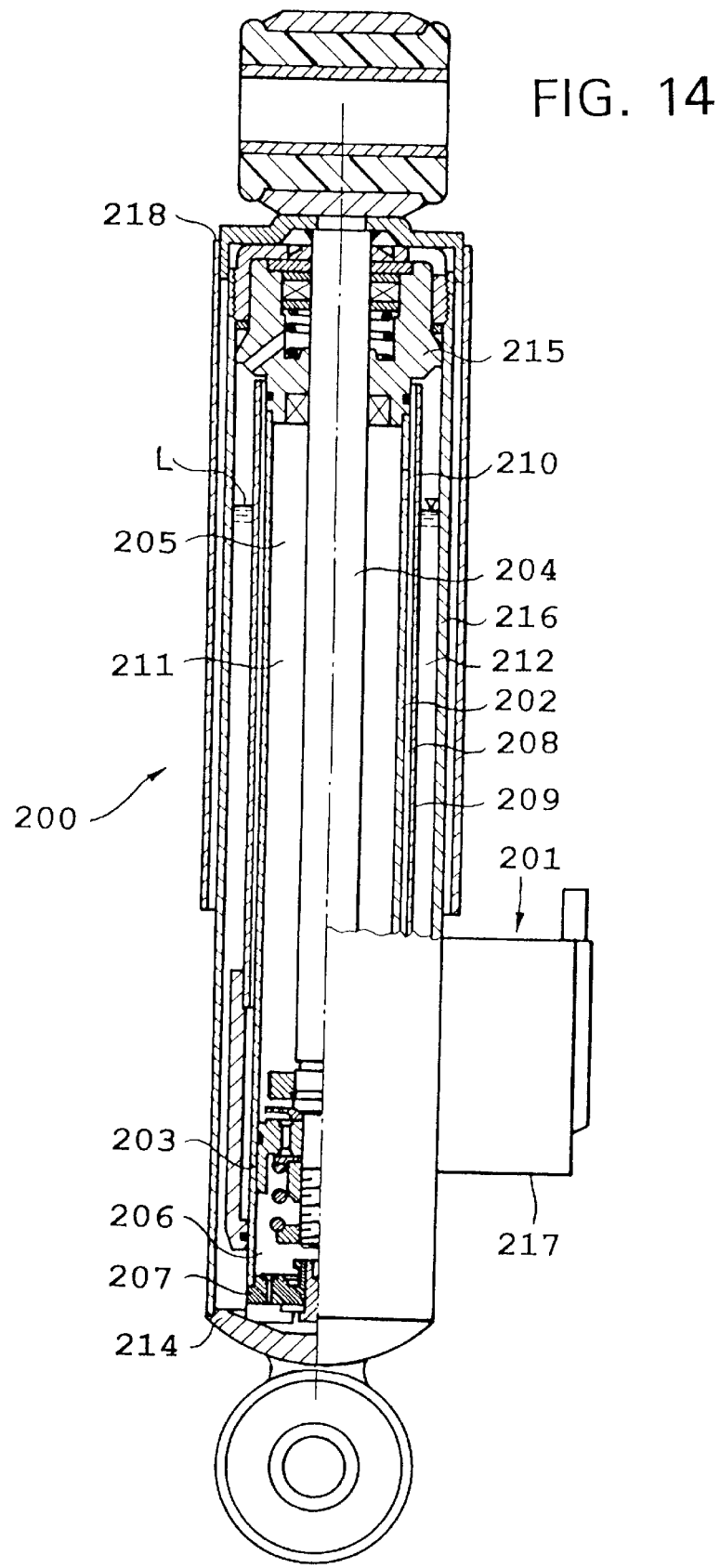
FIGS. 14 and 15 show a typical shock absorber in which the embodiments of the present invention could be incorporated.
Figure 15:
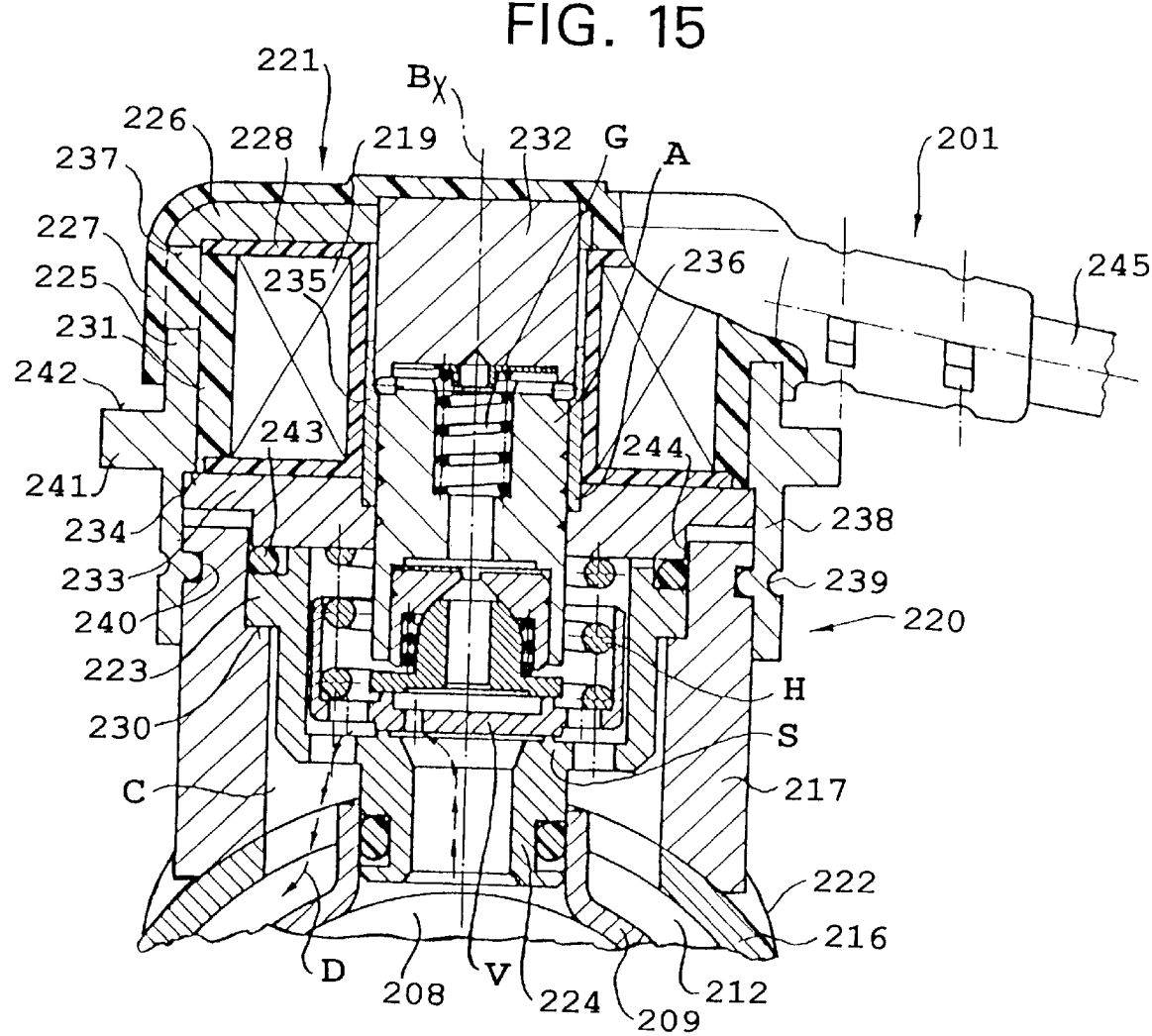

FIGS. 14 and 15 show a typical shock absorber or vibration damper in which the embodiments of the present invention may conceivably be incorporated. It should be understood that the components discussed hereinbelow with reference to FIGS. 14 and 15 may essentially be considered to be interchangeable with the components discussed hereinabove with reference to FIGS. 1 through 13.

FIG. 14 shows a complete shock absorber or oscillation damper 200, a detailed illustration of the valve unit 201 being omitted for the sake of clarity. The oscillation damper 200 essentially includes a pressure pipe 202 in which a piston 203 on a piston rod 204 divides a working space 205 into an upper or piston-rod-side working chamber 211. A bottom valve unit 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. The working space 205 is separated by the piston 203 into the upper working chamber 211 and the lower working chamber 206. Both the upper and the lower working chambers are filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211. According to an illustrative example, the oscillation damper works as follows: When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high such that a high pressure occurs within the lower working chamber 206 and also within the upper working chamber 211.

By the connecting orifice 210 and the fluid path 208 the upper working chamber 211 is connected with the compensating chamber 212 via the valve unit 201. This is shown in more detail in FIG. 15, which will be described later. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. Such, the damping force is reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. Such, the damping force is again reduced by the open bypass 210, 208, 201. It is to be noted that the direction of flow of the damping liquid through the bypass 210, 208, 201 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

In FIG. 15 one can again see the fluid path 208 and the compensating chamber 212, which are interconnectable through the valve unit 201. The fluid path 208 is connected to the upper working chamber 211 as shown in FIG. 14. The flow direction from the fluid path 208 to the compensating chamber 212 across the valve unit 201 is indicated in FIG. 15 by the dotted line D provided with arrows indicating the flow direction both for inward movement and outward movement of the piston rod 204 with respect to the pressure pipe 202. One can see in FIG. 15 a valve member V which can be lifted with respect to a valve seat S, such as to open the flow path D from the fluid path 208 to the compensating chamber 212.

For explaining the principles of the embodiment of the present invention shown in FIGS. 14 and 15, it is sufficient to say that the valve member. V is urged downward in the closing sense towards the valve seat S by a helical compression spring H and that the valve member V can be lifted in response to upward movement of an electromagnetic armature member A. This armature member A is biased in downward direction by a helical compression spring G and can be lifted by energization of a magnetic coil 219 which is energized through a current supple cable 245.

The valve unit 201 comprises a housing 220. This housing 220 is composed by the side tube 217 and a cover unit 221. The side tube 217 is welded at 222 to the container tube 216. The cover unit 221 is fastened to the side tube 217.

A pot-shaped valve components housing 233 is inserted into the side tube 217 and is axially located on a shoulder face 230 inside the side tube 217. Various valve components are located inside the valve components housing 223. The lower end of the valve components housing 223 is shaped as a tube section 224, which provides the valve seat S and is sealingly connected to the fluid path 208.

The cover unit 221 comprises an iron jacket 225 integral with an iron end wall 226. The iron jacket 225 and the iron end wall 226 are coated with a plastic layer 227. The annular electromagnetic coil 219 is housed within the iron jacket 225. This electromagnetic coil 219 is carried by a coil carrier 228, which is annular about the axis $B_x$ and is open in radial outward direction. The coil carrier 228 is closed in radially outward direction by a plastic material 229 integral with the plastic layer 227 through openings 237 of the iron jacket 225. The plastic layer 227 and the plastic material 231 are integrally moulded by injection moulding with the iron jacket 225, the iron end wall 226 integral therewith and the electromagnetic coil 219 carrier 228 being inserted into the injection mould.

A ferromagnetic core 232 is inserted into a central opening of the iron end wall 226 and covered by the plastic layer 227. An iron flange portion 233 is provided at the lower side of the electromagnetic coil 219 and is engaged with a shoulder face 234 of the iron jacket 225. A pole tube 235 is seated within an annular recess 236 of the iron flange portion 233. The pole tube 235 is sealingly connected to the iron flange portion 233 and to the ferromagnetic core 232. The armature A is guided within the pole tube 235. The pole tube 235 is made of nonmagnetic material so that the magnetic field lines are deflected by the lower end of the pole tube 235. The iron jacket 225, the iron end wall 226, the ferromagnetic core 232 and the iron flange portion 233 form a ferromagnetic core arrangement which toroidally surrounds the electromagnetic coil 219.

The cover unit 221 is fastened to the side tube 217 by a sleeve-shaped extension 238 of the iron jacket 225. This sleeve-shaped extension 238 axially overlaps the side tube 217 by a circumferential bead 239 being embossed into a circumferential groove 240 on the radially outer face of the side tube 217. The iron jacket 225 is provided with a pretensioning flange 241. The pretensioning flange 241 offers a pretension face 242. The cover unit 221 can be pretensioned in a downward direction as shown in FIG. 15 toward the container tube 216 by a pretensioning tool engaging the container tube 216, on the one hand, and the pretensioning face 242, on the other hand. Such, the iron flange portion 233 is pressed against the upper end of the valve components housing 223, the valve components housing 223 is engaged with the shoulder face 230 of the side tube 217, and the iron flange portion 233 is engaged with the shoulder face 234 of the iron jacket 225. The helical compression spring H is compressed between the iron flange portion 233 and the valve member V, which is seated on the valve seat S.

While maintaining this pretension of the cover unit 221 against the side tube 217, the bead 239 is rolled or caulked into the circumferential groove 240 of the side tube 217 so that after removing the pretensioning tool an internal pretension is maintained. A sealing ring 243 is, therefore, maintained in sealing engagement with the valve components housing 223, the iron flange portion 233 and the side tube 217. Such, the compartment C confined by the side tube 217 and the cover unit 221 is sealed against the atmosphere. All components of the valve unit 201 are positioned with respect to each other, and the helical compression spring H as well as the helical compression spring G and further springs are biased to the desired degree.

It is to be noted that the upper end of the side tube 217 is radially engaged at 244 with the iron flange portion 233 such that when rolling or caulking the bead 239 into the groove 240, no deformation of the side tube 217 and of the iron jacket 225 can occur.

The electromagnetic coil 219 is completely separated from the liquid within the compartment C by the iron flange portion 233. The pretension during connecting the cover unit 221 and the side tube 217 is selected such that no play can occur.

One feature of the invention resides broadly in a telescoping vibration damper consisting of a work cylinder, a piston which is guided on a piston rod and divides the work cylinder into two work chambers, and passages in the piston which empty on at least one end into a ring-shaped chamber, the encircling control edges of which are covered by valve plates (or discs), characterized by the fact that there is at least one additional valve plate 2 which is located at some axial distance from the first valve plate 1 and which, together with a support element 3, forms an additional ring-shaped chamber 5, whereby the first 4 and additional 5 ring-shaped chambers are connected to one another by means of a flow connection 6.

Another feature of the invention resides broadly in the telescoping vibration damper characterized by the fact that the first 1 and the additional valve plates 2 are supported with respect to one another by means of a spacer sleeve 7 located radially inward.

Yet another feature of the invention resides broadly in the telescoping vibration damper characterized by the fact that the support element 3 is in the form of an element which extends from radially inward to radially outward, which on the radial outside has a longitudinal extension 8 which runs at approximately a right angle, in the direction of the longitudinal axis, toward the valve plate 2.

Still another feature of the invention resides broadly in the telescoping vibration damper characterized by the fact that the extension 8 has a diameter which approximately equals that of the control edge 9.

A further feature of the invention resides broadly in the telescoping vibration damper characterized by the fact that the diameter D of the control edge 9 is greater than the diameter d of the control edge 10 of the extension 8.

Another feature of the invention resides broadly in the telescoping vibration damper characterized by the fact that the flow connection 6 is located in the vicinity of a projection (or shoulder or extension) 11 which is used to locate the valve plates.

Yet another feature of the invention resides broadly in the telescoping vibration damper characterized by the fact that the flow connection 6 is located in the vicinity of the inside diameter of the spacer sleeve 7.

Still another feature of the invention resides broadly in the telescoping vibration damper characterized by the fact that the support element 3 has a recess 12 which forms a constant passage between the two work chambers.

A further feature of the invention resides broadly in the telescoping vibration damper characterized by the fact that at least one valve plate 1 or 2 is centered with its center hole on the projection 11 which is used to locate it.

Another feature of the invention resides broadly in the telescoping vibration damper characterized by the fact that one of the first valve plate 1 and the second valve plate 2 is centered on a projection on the control edge 9 and has clearance in the central area.

Yet another feature of the invention resides broadly in the telescoping vibration damper characterized by the fact that the additional valve plate 2 is centered on the support element 3 and has clearance in the central area.

Still another feature of the invention resides broadly in the telescoping vibration damper characterized by the fact that the first and second valve plates 1, 2 as well as the spacer sleeve 7, have clearance in the central area to form a flow connection 6.

A further feature of the invention resides broadly in the telescoping vibration damper characterized by the fact that the first and/or additional valve plates 1, 2 consist of at least two individual plates (or discs).

Examples of hydraulic vibration dampers are to be found in U.S. Pat. No. 5,154,263 issued to Lizell on Oct. 13, 1992 and entitled "Method and Apparatus for Controlling the Flow of Damping Fluid Through a Piston"; U.S. Pat. No. 4,850,461 issued to Rubel on Jul. 25, 1989 and entitled "Shock Absorber Having a Throttle With a Variable Cross Section"; U.S. Pat. No. 5,335,757 issued to Knecht et al. on Aug. 9, 1994 and entitled "Hydraulic Adjustable Vibration Damper"; U.S. Pat. No. 5,251,730 issued to Ackermann et al. on Oct. 12, 1993 and entitled "Adjustable Vibration Damper"; U.S. Pat. No. 4,993,693 issued to Löhr et al. on Feb. 19, 1991 and entitled "Self-Pumping Hydropneumatic Shock Absorbing Leg with Internal Level Regulation"; U.S. Pat. No. 4,989,148 issued to Gürke et al. on Jan. 29, 1991 and entitled "Apparatus for the Computer-Assisted Control of Vibration Dampers of a Vehicular Suspension System as a Function of the Roadway"; U.S. Pat. No. 4,638,670 issued to Moser on Jan. 27, 1987 and entitled "Apparatus for the Determination of the Distance Traveled by a Piston in a Cylinder"; U.S. Pat. No. 4,880,086 issued to Knecht et al. on Nov. 14, 1989 and entitled "Adjustable Vibration Damper", all of the above-identified U.S. patents being hereby expressly incorporated by reference herein.

An additional example of a vibration damper is disclosed in U.S. Pat. No. 5,547,050 issued to Hubert Beck on Aug. 20, 1996, entitled "A Shock Absorber Having a Piston Permanently Attached to its Piston Rod", which is also expressly incorporated by reference herein.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 45 926.2-12, filed on Dec. 22, 1994, having inventor Hubert Beck, and DE-OS P 44 45 926.2-12 and DE-PS P 44 45 926.2-12, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper, said vibration damper comprising:
   a work cylinder, said work cylinder defining an interior chamber with a substantially central longitudinal axis;
   a piston disposed within said interior chamber of said work cylinder and displaceable along said longitudinal axis;
   said piston dividing said interior chamber of said work cylinder into a first piston chamber and a second piston chamber;
   a piston rod connected to said piston and extending outside of said interior chamber of said work cylinder;
   a fluid disposed in each of said first piston chamber and said second piston chamber;
   said fluid in said first piston chamber having a first piston chamber fluid pressure, and said fluid in said second piston chamber having a second piston chamber fluid pressure; and
   a flow control valve for controlling a flow of said fluid between said first and second piston chambers, said flow control valve comprising:
      a first annular chamber formed within said piston and in fluid communication with said first piston chamber;
      a first annular valve member disposed within said piston, one side of said first annular valve member bordering said first annular chamber;
      a first valve seat disposed adjacent said first annular valve member;
      first biasing means for biasing said first annular valve member into contact with said first valve seat against the force exerted by said first piston chamber fluid pressure on said one side of said first annular valve member;
      a second annular chamber formed within said piston and in fluid communication with said first piston chamber;
      a second annular valve member disposed within said piston, one side of said second annular valve member bordering said second annular chamber;
      a second valve seat disposed adjacent said second annular valve member;
      second biasing means for biasing said second annular valve member into contact with said second valve seat against the force exerted by said first piston chamber fluid pressure on said one side of said second annular valve member; and
      the other sides of said first and second annular valve members being in fluid communication with said second piston chamber;
      a fluid flow channel connecting said first and second annular chambers;
      a support member connected to at least one of said piston and said piston rod;
      said support member comprising a radial portion extending radially outward from said longitudinal axis;
      said support member additionally comprising a longitudinal portion extending substantially parallel to said longitudinal axis;
      said second valve seat being disposed on said longitudinal portion of said support member;
      said support member and said second annular valve member substantially enclosing said second annular chamber;
      said first valve seat comprising a first control edge for controlling a flow of said fluid between said first annular valve member and said first valve seat;
      said second valve seat comprising a second control edge for controlling a flow of said fluid between said second annular valve member and said second valve seat;
      the radial distance of said first control edge from said longitudinal axis being substantially equal to the radial distance of said longitudinal portion of said support member from said longitudinal axis;
      the radial distance of said first control edge from said longitudinal axis being substantially greater than the radial distance of said second control edge from said longitudinal axis;
      at least one of said piston and said piston rod comprising an extended portion extending along said longitudinal axis;
      said fluid flow channel connecting said first and second annular chambers being disposed substantially adjacent to and at least partially encircling said extended portion of said at least one of said piston and said piston rod;
      a spacer member at least partially encircling said longitudinal axis; and
      said first and second annular valve members being positioned at an axial distance from one another along said longitudinal axis by said spacer member.

2. A vibration damper according to claim 1, wherein said spacer member comprises a radially interior peripheral surface, and wherein at least a portion of said fluid flow channel is disposed adjacent said radially interior peripheral surface of said spacer member.

3. A vibration damper according to claim 2, wherein said fluid flow channel at least partially passes through said spacer member.

4. A vibration damper, said vibration damper comprising:
   a work cylinder, said work cylinder defining an interior chamber with a substantially central longitudinal axis;
   a piston disposed within said interior chamber of said work cylinder and displaceable along said longitudinal axis;
   said piston dividing said interior chamber of said work cylinder into a first piston chamber and a second piston chamber;
   a piston rod connected to said piston and extending outside of said interior chamber of said work cylinder;
   a fluid disposed in each of said first piston chamber and said second piston chamber;

said fluid in said first piston chamber having a first piston chamber fluid pressure, and said fluid in said second piston chamber having a second piston chamber fluid pressure; and a flow control valve for controlling a flow of said fluid between said first and second piston chambers, said flow control valve comprising:

a first annular chamber formed within said piston and in fluid communication with said first piston chamber;

a first annular valve member disposed within said piston, one side of said first annular valve member bordering said first annular chamber;

a first valve seat disposed adjacent said first annular valve member;

first biasing means for biasing said first annular valve member into contact with said first valve seat against the force exerted by said first piston chamber fluid pressure on said one side of said first annular valve member;

a second annular chamber formed within said piston and in fluid communication with said first piston chamber;

a second annular valve member disposed within said piston, one side of said second annular valve member bordering said second annular chamber;

a second valve seat disposed adjacent said second annular valve member;

second biasing means for biasing said second annular valve member into contact with said second valve seat against the force exerted by said first piston chamber fluid pressure on said one side of said second annular valve member; and the other sides of said first and second annular valve members being in fluid communication with said second piston chamber;

a fluid flow channel connecting said first and second annular chambers; said one of said first and second valve seats comprising an annular surface projecting from said one of said first and second valve seats in a direction substantially parallel to said longitudinal axis;

said one of said first and second annular valve members being disposed adjacent to said one of said first and second valve seats having a radially exterior periphery, said radially exterior periphery being disposed radially interior of and abutting said projecting annular surface; and said one of said first and second annular valve members being disposed adjacent to said one of said first and second valve seats being in a substantially noncontacting spaced disposition with respect to said extended portion of said at least one of said piston and said piston rod.

5. A vibration damper according to claim 4, wherein:

said second valve seat comprises an annular surface projecting from said longitudinal portion of said support member, said projecting annular surface being disposed substantially parallel to said longitudinal axis;

wherein said second valve members has a radially exterior periphery disposed radially interior of and abutting said projecting annular surface; and wherein said second annular valve member is in a substantially noncontacting spaced disposition with respect to said extended portion of said at least one of said piston and said piston rod.

6. A vibration damper according to claim 5, said vibration damper additionally comprising:

a spacer member at least partially encircling said longitudinal axis;

said first and second annular valve members being positioned at an axial distance from one another along said longitudinal axis by said spacer member;

said first annular valve member, said second annular valve member and said spacer member being in a substantially noncontacting spaced disposition with respect to said extended portion of said at least one of said piston and said piston rod.

7. A vibration damper according to claim 6, wherein each of said first and second annular valve members comprise at least two individual annular disk members disposed in laminar fashion.

8. A vibration damper, said vibration damper comprising:

a work cylinder, said work cylinder defining an interior chamber with a substantially central longitudinal axis;

a piston disposed within said interior chamber of said work cylinder and displaceable along said longitudinal axis;

said piston dividing said interior chamber of said work cylinder into a first piston chamber and a second piston chamber;

a piston rod connected to said piston and extending outside of said interior chamber of said work cylinder;

a fluid disposed in each of said first piston chamber and said second piston chamber;

said fluid in said first piston chamber having a first piston chamber fluid pressure, and said fluid in said second piston chamber having a second piston chamber fluid pressure; and a flow control valve for controlling a flow of said fluid between said first and second piston chambers, said flow control valve comprising:

a first annular valve member having a first radially exterior peripheral edge;

a first valve seat disposed adjacent said first radially exterior peripheral edge of said first annular valve member;

said first annular valve member comprising means for biasing said first radially exterior edge toward a closed position in contact with said first valve seat;

a second annular valve member having a second radially exterior peripheral edge;

a second valve seat disposed adjacent said second radially exterior peripheral edge of said second annular valve member;

said second annular valve member comprising means for biasing said second radially exterior edge toward a closed position in contact with said second valve seat;

said first annular valve member being movable to an open position in a direction away from said first valve seat and toward said second annular valve member; and said second annular valve member being movable to an open position in a direction away from said second valve seat and toward said first annular valve member.

9. A vibration damper according to claim 8, said vibration damper additionally comprising:

a first annular chamber formed within said piston and in fluid communication with said first piston chamber;

one side of said first annular valve member bordering said first annular chamber;

a second annular chamber formed within said piston;

one side of said second annular valve member bordering said second annular chamber; and a fluid flow channel connecting said first and second annular chambers.

10. A vibration damper according to claim 9 said vibration damper additionally comprising:

a support member connected to at least one of said piston and said piston rod;

said support member comprising a radial portion extending radially outward from said longitudinal axis;

said support member additionally comprising a longitudinal portion extending substantially parallel to said longitudinal axis;

said second valve seat being disposed on said longitudinal portion of said support member; and said support member and said second annular valve member substantially enclosing said second annular chamber.

11. A vibration damper according to claim 10, said vibration damper additionally comprising:

a spacer member at least partially encircling said longitudinal axis;

said first and second annular valve members being positioned at an axial distance from one another along said longitudinal axis by said spacer member.

* * * * *